United States Patent
Kweon et al.

(10) Patent No.: US 8,494,164 B2
(45) Date of Patent: Jul. 23, 2013

(54) METHOD FOR CONNECTING WIRELESS COMMUNICATIONS, WIRELESS COMMUNICATIONS TERMINAL AND WIRELESS COMMUNICATIONS SYSTEM

(75) Inventors: Tae-deok Kweon, Seoul (KR); Hyun-kyu Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 187 days.

(21) Appl. No.: 12/903,905

(22) Filed: Oct. 13, 2010

(65) Prior Publication Data

US 2011/0188657 A1    Aug. 4, 2011

(30) Foreign Application Priority Data

Jan. 29, 2010   (KR) .................. 10-2010-0008417

(51) Int. Cl.
*G06F 21/00*    (2006.01)
(52) U.S. Cl.
USPC ........................................... 380/270
(58) Field of Classification Search
USPC .................. 380/270; 455/436, 446
See application file for complete search history.

(56) References Cited

U.S. PATENT DOCUMENTS

| | | | |
|---|---|---|---|
| 7,483,984 B1 * | 1/2009 | Jonker et al. | 709/226 |
| 2003/0169765 A1 * | 9/2003 | Grammel | 370/465 |
| 2003/0204748 A1 | 10/2003 | Chiu | |
| 2006/0209773 A1 | 9/2006 | Hundal et al. | |
| 2007/0254614 A1 | 11/2007 | Muralidharan et al. | |
| 2008/0247369 A1 * | 10/2008 | Sethi et al. | 370/338 |

FOREIGN PATENT DOCUMENTS

| | | |
|---|---|---|
| EP | 1928125 A1 | 6/2008 |
| JP | 2006-345205 A | 12/2006 |
| KR | 10-2004-0015802 A | 2/2004 |
| WO | 03/007588 A2 | 1/2003 |

OTHER PUBLICATIONS

Wi-Fi Alliance, "Wi-Fi Certified for Wi-Fi Protected Setup: Easing the User Experience for Home and Small Office Wi-Fi Networks", 2007, p. 1-14.

Communication dated Mar. 16, 2011, issued by the European Patent Office in counterpart European Application No. 10194474.2.

* cited by examiner

*Primary Examiner* — Brandon Hoffman
*Assistant Examiner* — Anthony Brown
(74) *Attorney, Agent, or Firm* — Sughrue Mion, PLLC

(57) ABSTRACT

A method for connecting wireless communications, a wireless communications terminal and a wireless communications system are provided. The method includes receiving a first signal including assumed configuration data; determining an availability of a wireless communications connection using the assumed configuration data; sending an association request message, if it is determined that the wireless communications connection is available; and receiving a second signal including connection configuration data, which is different from the assumed configuration data, in response to the association request message.

19 Claims, 3 Drawing Sheets

METHOD FOR CONNECTING WIRELESS COMMUNICATIONS, WIRELESS COMMUNICATIONS TERMINAL AND WIRELESS COMMUNICATIONS SYSTEM

CROSS-REFERENCE TO RELATED APPLICATIONS

This application claims priority from Korean Patent Application No. 2010-0008417, filed on Jan. 29, 2010, in the Korean Intellectual Property Office, the disclosure of which is herein incorporated by reference in its entirety.

BACKGROUND

1. Field

Apparatuses and methods consistent with exemplary embodiments relate to a method for connecting wireless communications, a wireless communications terminal and a wireless communications system, and more particularly, to a method for connecting wireless communications between an access point and a wireless communications terminal, a wireless communications terminal, and a wireless communications system.

2. Description of the Related Art

Wireless communications technologies have been popular as a technology to connect to network such as the Internet. The wireless communications technology refers to a communications technology between a user's wireless communications terminal and an access point. In this case, the access point acts as a control point and works as a connector between wireless and wired Local Area Networks (LANs). A wireless communications terminal uses a Service Set Identifier (SSID) to connect to the access point. The SSID is an identifier to identify the network of a user and consists of an English letter and a number up to 32 digits. Generally, the SSID is included in a beacon signal which is sent periodically from the access point and is identified by extracting the beacon signal in the wireless communications terminal.

Anyone who is in the range of the electronic wave from the wireless LAN can receive wireless signals from the wireless LAN, so it is necessary to install a security function. The security function is a method for limiting an access to the wireless LAN, such as filtering using an SSID or Medium Access Control (MAC) address, and an encryption method such as, for example, Wired Equivalent Privacy (WEP). The SSID or MAC address filtering refers to registering for the access point the original number address of each device within a wireless LAN in advance. Therefore, only a registered wireless communications terminal can access the wireless LAN. In WEP, a common encryption key is used to encrypt data between the access point and the wireless communications terminal.

Currently, applications using wireless devices are provided in electronic appliances such as a TV, set top box, etc. As it has been explained above, both an SSID and password are necessary to connect wireless devices to a wireless LAN, and a Push Button Configuration (PBC) method of Wi-Fi Protect Setup (WPS) has been developed to eliminate a complicated input procedure. The PBC method is a way of pushing a button located on the wireless communications terminal with which a user wants to connect to the access point and being automatically connected in two minutes. The PBC method has improved the traditional manual method, but consumers in general are not familiar with the terms such as WPS and PBC and the way of using these features. Therefore, the method is not much used by consumers, and users may experience difficulty in finding a button in the device and connecting to the access point.

SUMMARY

Exemplary embodiments address at least the above disadvantages and other disadvantages not described above. Also, the exemplary embodiments are not required to overcome the disadvantages described above, and an exemplary embodiment may not overcome any of the disadvantages described above.

The exemplary embodiments provide a method for connecting wireless communications to determine whether wireless communication is available with an access point using an assumed configuration data, wireless communications terminal, and wireless communications system.

According to an aspect of an exemplary embodiment, there is provided a method for establishing wireless communications, the method including receiving a first signal including assumed configuration data from the access point, determining whether a wireless communications connection with the access point is available using the assumed configuration data, sending an association request message to the access point, if it is determined that the wireless communications connection with the access point is available, and receiving a second signal including connection configuration data from the access point in response to the association request message.

The assumed configuration data may be encrypted assumed configuration data, and the determining the availability may include decrypting the encrypted assumed configuration data and determining the availability of the wireless communications connection based on the decrypted assumed configuration data.

The assumed configuration data may be data provided to check whether wireless communications is available, and the connection configuration data may be data used to wirelessly connect to the access point.

The assumed configuration data may be data based on a manufacturer of the access point.

The first signal may be a beacon signal broadcast from the access point.

The assumed configuration data may include an SSID and a password.

The method may further include setting up the wireless communications connection to the access point using a connection channel indicated in the connection configuration data.

The access point may be a television (TV) or a personal computer (PC) and the wireless communications terminal may be a mobile phone or a media player.

According to an aspect of another exemplary embodiment, there is provided a wireless communications terminal, which is able to wirelessly communicate with an access point, the wireless communications terminal including a communications unit which receives a second signal including connection configuration data as a response to receiving a first signal including assumed configuration data and sending an association request message; and a control unit which determines whether a wireless communications connection with the access point is available using the assumed configuration data, and controls the communications unit to send the association request message to the access point if it is determined that the wireless communications connection with the access point is available.

The communications unit may receive the first signal including the assumed configuration data as encrypted assumed configuration data from the access point, and the control unit may decrypt the encrypted assumed configuration data and determine whether the wireless communications connection with the access point is available based on the decrypted assumed configuration data.

The assumed configuration data may be data used to check whether the wireless communications connection is available between the access point and the wireless communications terminal, and the connection configuration data may be data used to wirelessly connect the access point and the wireless communications terminal.

The assumed configuration data may be based on a manufacturer of the access point.

The first signal may be a beacon signal broadcast from the access point.

The assumed configuration data may include an SSID and a password.

The communications unit may wirelessly communicate with the access point using a connection channel indicated in the connection configuration data.

The access point may be a TV or a PC, and the wireless communications terminal may be a mobile phone or a media player.

According to an aspect of another exemplary embodiment, there is provided a wireless communications system that includes an access point and a wireless communication terminal, wherein the access point sends a first signal including assumed configuration data to the wireless communications terminal and, in response to receiving an association request message from the wireless communications terminal, sends a second signal including connection configuration data, which differs from the assumed configuration data, to the wireless communications terminal; and the wireless communications terminal determines whether wireless communications connection is available with the access point based on the assumed configuration data from the access point and, if it is determined that the wireless communications connection with the access point is available, sends the association request message to the access point.

According to another aspect of an exemplary embodiment, there is provided a wireless communications terminal, which is able to wirelessly communicate with an access point, the wireless communications terminal comprising a communications unit that receives assumed configuration data that is related to a manufacturer of the access point; and a control unit that comparing the received assumed configuration data to assumed configuration data related to a manufacturer of the wireless communications terminal and, if the received assumed configuration data is the same as the assumed configuration data of the wireless communications terminal, controls the communications unit to send an association request message.

In response to the communications unit sending the association request signal, the communications unit may receive connection configuration data for connecting to the access point automatically without intervention of a user of the wireless communications terminal

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
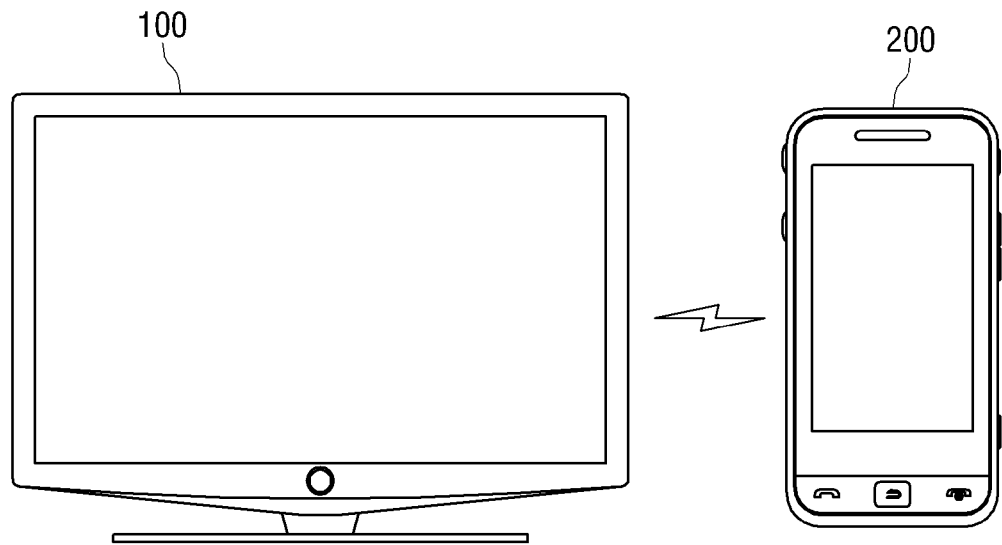
FIG. 1 is a view illustrating an access point and a wireless communications terminal according to an exemplary embodiment.

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that exemplary embodiments can be carried out without those specifically defined matters. Also, well-known functions or constructions are not described in detail since they would obscure the exemplary embodiments with unnecessary detail.

FIG. 1 is a view of an access point 100 and a wireless communications terminal 200 according to an exemplary embodiment. As illustrated in FIG. 1, the access point 100 is a TV and the wireless communications terminal 200 is a mobile phone according to an exemplary embodiment. A soft access point is included within the TV to allow the TV to function as an access point. The soft access point is an access point on a software basis and can include a Wireless Fidelity (Wi-Fi) adapter and suitable driver software operating in a host. Moreover, wireless communication is available in a mobile phone which includes various applications for accessing the Internet as is known in the art.

Figure 2:
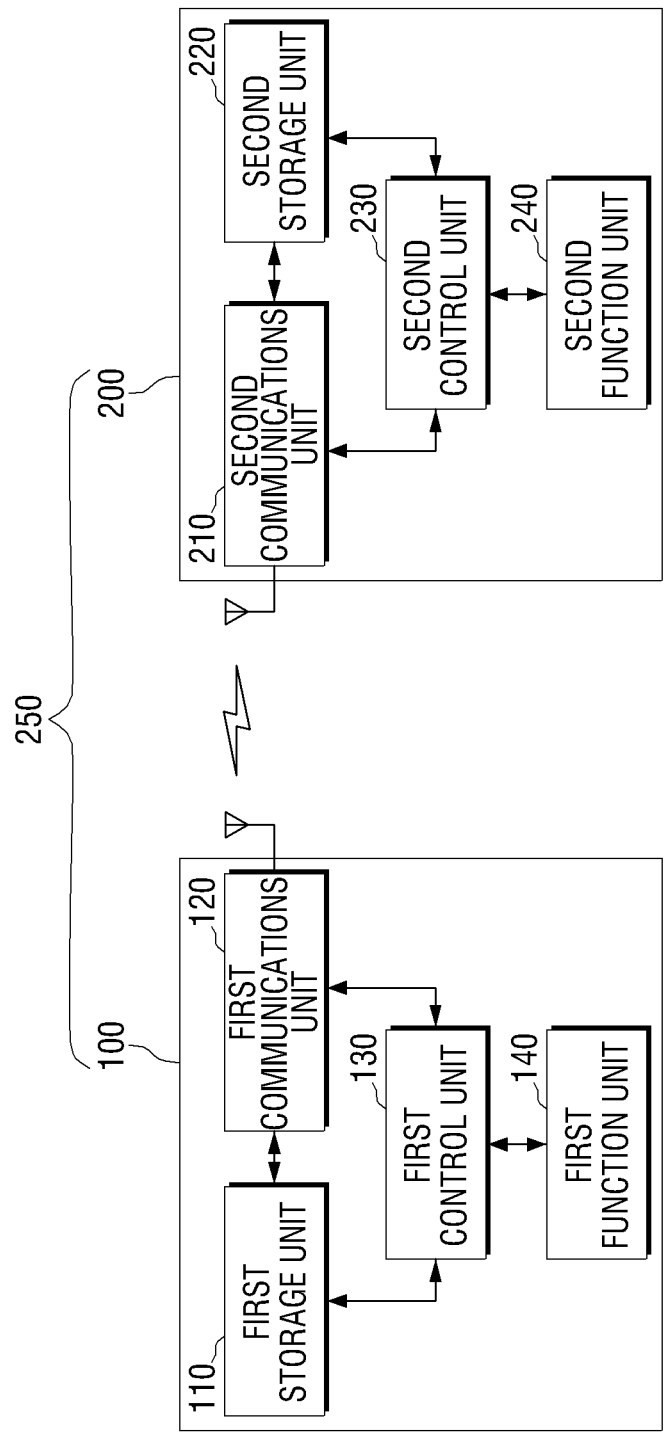
FIG. 2 is a block diagram illustrating a wireless communication system according to another exemplary embodiment.

With reference to FIG. 2, a wireless communications system 250 according to an exemplary embodiment will be explained in detail.

FIG. 2 is a block diagram illustrating the wireless communication system 250 according to an exemplary embodiment. The wireless communication system includes the access point 100 and the wireless communications terminal 200.

As FIG. 2 illustrates, the access point 100 includes a first storage unit 110, a first communications unit 120, a first control unit 130 and a first function unit 140. The wireless communications terminal 200 includes a second storage unit 210, a second communications unit 220, a second control unit 230 and a second function unit 240.

The first storage unit 110 stores various data used by the access point 100 to communicate wirelessly. In particular, the first storage unit 110 stores assumed configuration data which can be used to check whether wireless communication is available between the access point 100 and the wireless communications terminal 200, as will be described in more detail below. The assumed configuration data is data stored at the time of manufacturing the access point 100, and the assumed configuration data comprises an assumed Service Set Identifier (SSID) and an assumed password. By using the assumed configuration data as described further below, a wireless communications connection may be made available automatically among products made by the same company The first communications unit 120 performs wireless communications with the wireless communications terminal 200.

In detail, the first communications unit 120 broadcasts a beacon signal including the assumed configuration data that has been encrypted. If a probe request signal is received from the wireless communications terminal 200, the first communications unit 120 sends a probe response signal. If the first communications unit 120 receives an authentication request signal, the first communications unit 120 sends an authentication response signal, and if the first communications unit 120 receives an association request signal, the first communications unit 120 sends an association response signal.

After going through the above mentioned process, if the access point 100 is confirmed by the wireless connection terminal 200 to be available to wirelessly communicate with the wireless communications terminal 200, the first communications unit 120 will receive an EAPOL-START signal from the wireless communications terminal 200, as described in more detail below. In response, the access point 100 sends an Extensible Authentication Protocol (EAP) Identify Request signal including connection configuration data to the wireless communications unit 200. The connection configuration data includes an SSID and a password, different from that in the assumed configuration data, to attempt to connect the access point 100 to the wireless communications terminal 200, and waits for a response from the wireless communications terminal 200. If the first communications unit 120 receives an EAP Identify Response signal from the wireless communications terminal 200, the first communications unit 120 sends an EAP Request signal with WPS start information to the wireless communications terminal 200.

The first function unit 140 performs the function of the electronic appliance that is operating as the access point 100. For example, if the access point 100 according to the exemplary embodiment is a TV, the first function unit 140 performs TV functions, such as playing broadcast contents received from an external source.

The first control unit 130 controls the operations of the access point 100 according to a command through an input unit (not illustrated). In particular, the first control unit 130 controls the first communications unit 120 to allow the access point 100 to communicate with the wireless communications terminal 200, as it has been described above.

The second communications unit 210 wirelessly communicates with the access point 100. In detail, the second communications unit 210 receives a beacon signal including the encrypted assumed data from the first communications unit 120. The second communication unit 210 sends the beacon signal to the second control unit 230, so that the second control unit 230 can determine whether the access point 100 can automatically wirelessly communicate with the wireless communications terminal 200, as described in more detail below. If the access point 100 and the wireless communications terminal 200 are determined to be available to automatically wirelessly communicate with each other, the second communications unit 210 sends a probe request signal to the access point 100. If a probe response signal is received from the access point 100, the second communications unit 210 sends an authentication request signal and, after receiving an authentication request response, sends an association request signal.

After going through the above process, if the wireless communications terminal 200 and the access point 100 are determined to be available to communicate with each other, the second communication unit 210 sends an EAP START signal to the access point 100 and receives in return an EAP Identify Request signal for a real wireless communications connection. If an EAP Identify Request signal including connection configuration data is received from the access point 100, the second communication unit 210 sends an EAP Response signal to the access point 100.

The second storage unit 220 stores various information to enable the wireless communications terminal 200 to communicate wirelessly. In particular, in a similar manner to the access point 100 described above, the second storage unit 220 stores assumed configuration data that is used to check whether wireless communication connection is available between the access point 100 and the wireless communications terminal 200, as described in more detail below. The assumed configuration data stored in the second storage unit 220 is data stored at the time of manufacturing the wireless communications terminal 200 and comprises an assumed SSID and an assumed password. With the use of the assumed configuration data as described in more detail below, a wireless communications connection may be made available automatically among products made by the same company.

The second function unit 240 performs the function of electronic appliance which operates as the wireless communications terminal 200. For example, if the wireless communications terminal 200 is a mobile phone according to an exemplary embodiment, the second function unit 240 performs functions such as communicating with an outside communications device.

The second control unit 230 controls general operations of the wireless communications terminal 200 according to a command input through an input unit (not illustrated). In particular, the second control unit 230 controls the second communications unit 210 to enable the wireless communications terminal 200 to communicate with the access point 100 as has been explained above.

The second control unit 230 decrypts the encrypted assumed configuration data included in the beacon signal. The second control unit 230 checks whether the access point 100 can wirelessly communicate with the wireless communications terminal 200 using the decrypted assumed configuration data.

For example, if the assumed configuration data included in the beacon signal received from the access point 100 is an assumed configuration SSID of "Samsung" and an assumed password of "1234", the second control unit 230 checks whether the assumed configuration data of the wireless communication terminal 200, i.e., the assumed configuration SSID and the assumed configuration password, which are stored in the second storage unit 220 of the wireless communications terminal 200, are equal to "Samsung" and "1234", respectively. If the assumed SSID and password included in the assumed configuration data from the access point 100 are identical to the assumed configuration SSID and password, respectively, stored in the second storage unit 220 of the wireless communications terminal 200, the second control unit 220 determines that wireless communications connection is available between the access point 100 and the wireless communications terminal 200 and controls the second communications unit 210 to send a probe request signal including the assumed configuration SSID to the access point 100.

However, if the assumed SSID and password included in the assumed configuration data from the access point 100 are not identical to the assumed configuration SSID and password, respectively, stored in the second storage unit 220 of the wireless communications terminal 200, the second control unit 230 determines that wireless communications connection is not available between the access point 100 and the wireless communications terminal 200 and controls the second communications unit 210 to not send any signal.

As has been mentioned above, if it is determined that wireless communications connection is available between the access point 100 and the wireless communications terminal 200 using the connection configuration data stored at the time of manufacturing, it is possible to use wireless communications among products made by the same company automatically without any particular action on the part of the user.

Figure 3:
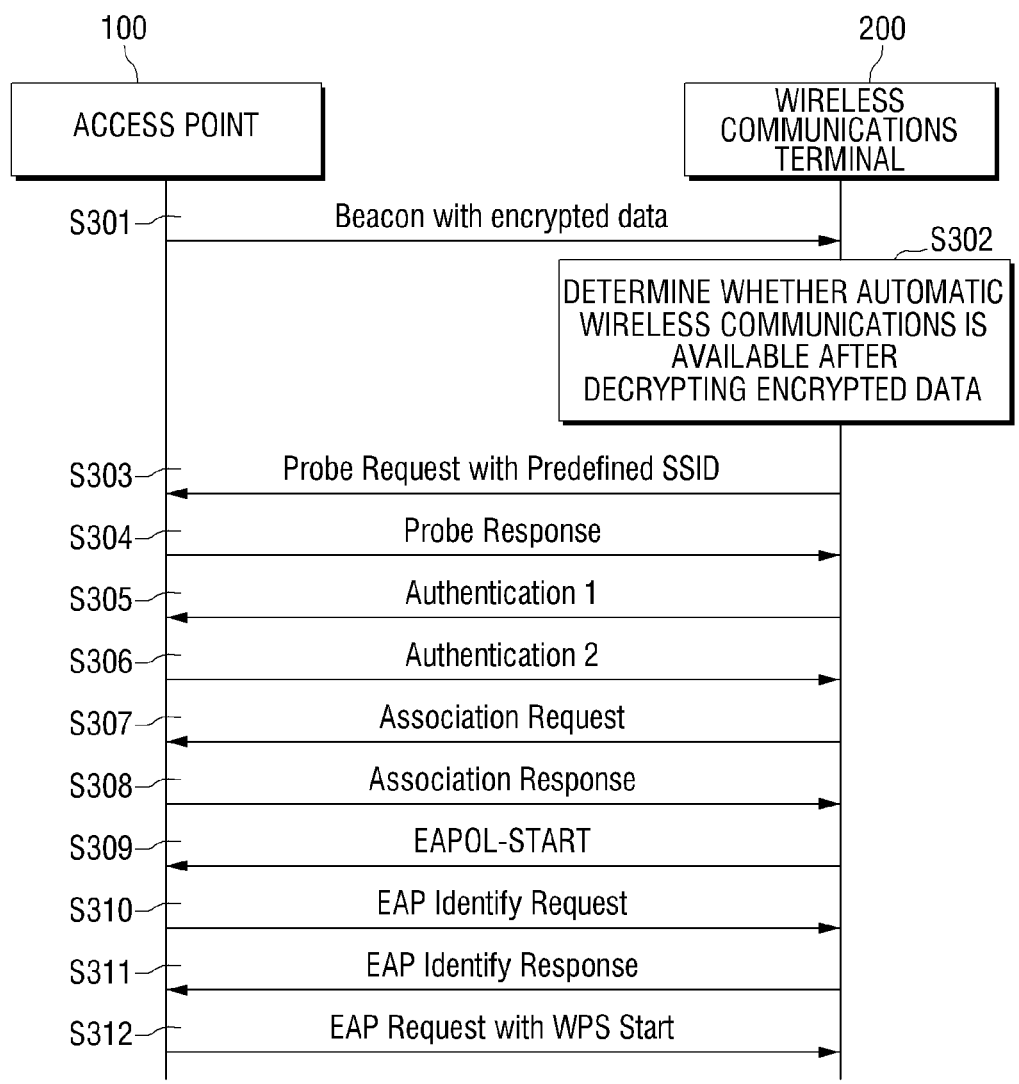
FIG. 3 is flowchart illustrating a wireless communications connection process between an access point and a wireless communications terminal according to another exemplary embodiment.

With reference to FIG. 3, a method of wireless communications connection between the access point 100 and the wireless communications terminal 200 will be explained.

FIG. 3 is a flowchart of a signal flow illustrating a process of wireless communications connection between the access point 100 and the wireless communications terminal 200.

The access point 100 sends a beacon signal including the encrypted assumed configuration data in a broadcasting way, i.e., via sending a broadcast signal (S301). For example, the assumed configuration data may comprise the assumed configuration SSID of "Samsung" and the assumed configuration password of "1234". It should be noted that the particular values of the SSID and password are not limited, and the values for the SSID and the password may be any values and may be provided in different formats, etc.

If the wireless communications terminal 200 receives the encrypted assumed configuration data, the wireless communication terminal 200 decrypts the received encrypted assumed configuration data and automatically determines whether wireless communications connection is available (S302). In detail, the second wireless communications terminal 200 checks whether the assumed configuration SSID and the assumed configuration password stored in the second storage unit 220 are the same as those in the received decrypted assumed configuration data, i.e., "Samsung" and "1234:", respectively.

If the assumed SSID and password included in the received assumed configuration data are identical to the assumed configuration SSID and password, respectively, that are stored in the second storage unit 220, the wireless communications terminal 200 determines that wireless communications connection is available between the access point 100 and the wireless communications terminal 200 and sends a probe request signal including the assumed configuration SSID to the access point 100 (S303).

However, if the assumed SSID and the assumed password included in the received assumed configuration data are not identical to the assumed configuration SSID and password, respectively, that are stored in the second storage unit 220, the wireless communications terminal 200 determines that wireless communications connection is not available between the access point 100 and the wireless communications terminal 200 and does not respond.

If the access point 100 receives the probe request signal, the access point 100 sends a probe response signal to the wireless communications terminal 200 (S304).

If the wireless communications terminal 200 receives the probe response signal, the wireless communications terminal 200 sends an authentication signal to the access point 100 (S305) and receives an authentication response from the access point 100 (S306) to perform an authentication procedure (S305, S306).

After going through the authentication procedure, the wireless communications terminal 200 sends an association request signal to the access point 100 (S307) and receives an association response signal in response (S308).

Based on the above process, the wireless communications terminal 200 determines that wireless communications connection is available with the access point 100 and sends an EAPOL START signal to the access point 100 for a real wireless communications connection (S309).

If the access point 100 receives the EAPOL START signal, the access point 100 sends an EAP Identify request signal including connection configuration data with SSID and password to the wireless communications terminal for a real wireless communications connection (S310). The SSID and password in the connection configuration data are different from the SSID and password in the assumed configuration data. Moreover, the connection configuration data is not stored at the time of manufacturing, but it can be set arbitrarily. For example, a user may set the connection configuration data, or the connection configuration data may be generated by the access point 100. To transmit new connection configuration data, the wireless communications connection established using the existing assumed configuration data is disconnected.

If the wireless communications terminal 200 receives the EAP Identify request signal, the wireless communications terminal 200 sends an EAP Identify response signal to the access point 100 as a response (S311).

If the access point 100 confirms the EAP Identify response signal, the access point 100 sends an EAP request signal including WPS start information (S312), thereby starting wireless communications connection between the access point 100 and the wireless communications terminal 200. The wireless communications connection between the access point 100 and the wireless communications terminal 200 is available through a channel included in the connection configuration data.

In the above process, the access point 100 and the wireless communications terminal 200 use assumed configuration data to determine whether the wireless communications connection is available, and perform a real wireless communications connection. Accordingly, wireless communications connection is available automatically between the access point 100 and the wireless communications terminal 200 without any particular action, for example, an action by a user, so that wireless communications may be established with ease.

Thus far, the access point 100 has been described as a TV, but this is just an exemplary embodiment. The access point can be realized as any type of electronic appliance such as a PC, a set top box, or a laptop computer which can function as an access point.

Thus far, the wireless communications terminal 200 has been described as a mobile phone, but this is just an exemplary embodiment. The wireless communications terminal 200 can be realized as any type of electronic appliance such as a media player, or other device which includes wireless communications capability.

As such, according to various exemplary embodiments, the wireless communications terminal 200 uses assumed configuration data stored at the time of manufacturing to determine whether wireless communications connection is available. It is thus possible to connect to a network with ease, because the access point 100 and wireless communications terminal 200 are connected without a particular action.

The foregoing exemplary embodiments and advantages are merely exemplary and are not to be construed as limiting the inventive concept. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for establishing wireless communications of a wireless communications terminal which wirelessly communicates with an access point, the method comprising:
   receiving, from the access point, a first signal including assumed configuration data comprising a Service Set Identifier (SSID) and a password;
   determining an availability of a wireless communications connection with the access point using the assumed configuration data;

sending an association request message to the access point, if it is determined that the wireless communications connection with the access point is available; and receiving a second signal including connection configuration data, which is different from the assumed configuration data, from the access point in response to the association request message.

2. The method as claimed in claim 1, wherein the assumed configuration data is encrypted assumed configuration data, and the determining the availability comprises decrypting the encrypted assumed configuration data and determining the availability of the wireless communications connection based on the decrypted assumed configuration data.

3. The method as claimed in claim 1, wherein the assumed configuration data is data provided to check whether the wireless communications connection is available, and the connection configuration data is data used to wirelessly connect to the access point.

4. The method as claimed in claim 1, wherein the assumed configuration data is based on a manufacturer of the access point.

5. The method as claimed in claim 1, wherein the first signal is a beacon signal broadcast from the access point.

6. The method as claimed in claim 1, further comprising:
setting up the wireless communications connection to the access point using a connection channel indicated in the connection configuration data.

7. The method as claimed in claim 1, wherein the access point is a TV or a PC, and the wireless communications terminal is a mobile phone or a media player.

8. A wireless communications terminal, which is able to wirelessly communicate with an access point, the wireless communications terminal comprising:
a communications unit which receives a second signal including connection configuration data as a response to receiving a first signal including assumed configuration data and sending an association request message; and
a control unit which determines whether a wireless communications connection with the access point is available using the assumed configuration data, and controls the communications unit to send the association request message to the access point if it is determined that the wireless communications connection with the access point is available,
wherein the assumed configuration data comprises a Service Set Identifier (SSID) and a password.

9. The terminal as claimed in claim 8, wherein the communications unit receives the first signal including the assumed configuration data as encrypted assumed configuration data from the access point, and the control unit decrypts the encrypted assumed configuration data and determines whether the wireless communications connection is available with the access point based on the decrypted assumed configuration data.

10. The terminal as claimed in claim 8, wherein the assumed configuration data is data used to check whether wireless communications connection is available between the access point and the wireless communications terminal, and the connection configuration data is data used to wirelessly connect the access point and the wireless communications terminal.

11. The terminal as claimed in claim 8, wherein the assumed configuration data is based on a manufacturer of the access point.

12. The terminal as claimed in claim 8, wherein the first signal is a beacon signal broadcast from the access point.

13. The terminal as claimed in claim 8, wherein the communications unit wirelessly communicates with the access point using a connection channel indicated in the connection configuration data.

14. The terminal as claimed in claim 8, wherein the access point is a television or a personal computer, and the wireless communications terminal is a mobile phone or a media player.

15. A wireless communications system comprising an access point and a wireless communications terminal, wherein
the access point sends a first signal including assumed configuration data to the wireless communications terminal and, in response to receiving an association request message from the wireless communications terminal, sends a second signal including connection configuration data, which differs from the assumed configuration data, to the wireless communications terminal; and
the wireless communications terminal determines whether wireless communications connection is available with the access point based on the assumed configuration data from the access point and, if it is determined that the wireless communications connection with the access point is available, sends the association request message to the access point,
wherein the assumed configuration data comprises a Service Set Identifier (SSID) and a password.

16. The method as claimed in claim 1, further comprising connecting to the access point using the connection configuration data.

17. A wireless communications terminal, which is able to wirelessly communicate with an access point, the wireless communications terminal comprising:
a communications unit that receives assumed configuration data that is related to a manufacturer of the access point; and
a control unit that compares the received assumed configuration data to assumed configuration data related to a manufacturer of the wireless communications terminal and, if the received assumed configuration data is the same as the assumed configuration data of the wireless communications terminal, controls the communications unit to send an association request message,
wherein the assumed configuration data comprises a Service Set Identifier (SSID) and a password.

18. The wireless communications terminal as claimed in claim 17, wherein, in response to the communications unit sending the association request signal, the communications unit receives connection configuration data for connecting to the access point automatically without intervention of a user of the wireless communications terminal.

19. The method as claimed in claim 1, wherein the determining comprising:
comparing the SSID and the password received from the access point and a SSID and a password stored in the wireless communications terminal; and
determining an availability of wireless communications connection with the access point if the SSID and the password received from the access point are identical to the SSID and the password, respectively.

* * * * *